US006758535B2

(12) United States Patent
Smith

(10) Patent No.: US 6,758,535 B2
(45) Date of Patent: Jul. 6, 2004

(54) LIGHTWEIGHT, ADJUSTABLE-HEIGHT, AXLE

(76) Inventor: Fred P. Smith, 228 S. Scenic Dr., Alpine, UT (US) 84004

( * ) Notice: Subject to any disclaimer, the term of this patent is extended or adjusted under 35 U.S.C. 154(b) by 0 days.

(21) Appl. No.: 10/189,170

(22) Filed: Jul. 3, 2002

(65) Prior Publication Data

US 2003/0020323 A1 Jan. 30, 2003

Related U.S. Application Data

(63) Continuation of application No. 09/511,596, filed on Feb. 23, 2000, now Pat. No. 6,416,136.

(51) Int. Cl.[7] .......................... B60B 35/00; B60B 37/00; B62D 61/12; B62D 53/00
(52) U.S. Cl. ..................... 301/128; 301/124.1; 180/209; 280/405.1
(58) Field of Search .......................... 301/124.1 R, 125, 301/126, 127, 128, 129, 131, 132; 280/86.5, 43, 405.1, 406.1, 406.2, 407, 407.1; 180/209

(56) References Cited

U.S. PATENT DOCUMENTS

| | | | |
|---|---|---|---|
| 1,890,766 A | 12/1932 | Adams | 280/124.108 |
| 2,034,476 A | 3/1936 | Lemay | 280/782 |
| 2,416,388 A | 2/1947 | Hendrix | 267/185 |
| 2,598,831 A | 6/1952 | Ramey | 280/35 |
| 2,804,157 A | 8/1957 | Preston | 180/340 |
| 2,902,290 A | 9/1959 | Hausmann | 280/124.127 |
| 3,000,673 A | 9/1961 | Lansing | 301/128 |
| 3,112,100 A | 11/1963 | Prichard | 366/41 |
| 3,191,961 A | 6/1965 | Brennan et al. | 280/81.1 |
| 3,271,077 A | 9/1966 | Timmer et al. | 298/22 R |
| 3,371,543 A | 3/1968 | Jackson et al. | 74/15.4 |
| 3,694,001 A | 9/1972 | McGee | 280/124.116 |
| 3,752,496 A | 8/1973 | Meinecke, Jr. | 280/81.1 |
| 3,838,885 A | 10/1974 | Brennan et al. | 298/22 R |
| 3,895,818 A | 7/1975 | Fearon | 280/81.1 |
| 3,912,293 A | 10/1975 | Harbers | 280/81 R |
| 3,970,166 A | 7/1976 | Sheppard | 180/400 |
| 4,063,779 A | 12/1977 | Martin et al. | 298/22 P |
| 4,084,833 A | 4/1978 | Mohrbacker et al. | 280/81.6 |
| 4,195,856 A | 4/1980 | Larson et al. | 280/81.1 |
| 4,204,697 A | 5/1980 | Santerre | 280/149.2 |
| 4,314,709 A | 2/1982 | Silbernagel | 280/81.6 |
| 4,421,331 A | 12/1983 | Ferris | 280/81.1 |
| 4,492,389 A | 1/1985 | Wyatt et al. | 280/86.5 |
| 4,500,112 A | 2/1985 | Raidel | 280/124.109 |
| 4,621,872 A | 11/1986 | Yotsumoto et al. | 301/137 |
| 4,684,142 A | 8/1987 | Christenson | 280/81.1 |
| 4,693,486 A | 9/1987 | Pierce et al. | 280/80.1 |
| 4,705,133 A | 11/1987 | Christenson et al. | 180/209 |
| 4,733,744 A | 3/1988 | Glaze | 180/256 |
| 4,762,421 A | 8/1988 | Christenson et al. | 366/54 |
| 4,783,096 A | 11/1988 | Ramsey et al. | 280/86.5 |
| 4,848,783 A | 7/1989 | Christenson et al. | 280/405.1 |
| 4,940,287 A | 7/1990 | Ritchie | 298/23 R |
| 4,941,408 A | 7/1990 | Lovitt, Jr. | 105/72.2 |
| 5,018,593 A | 5/1991 | Hermann | 180/24.02 |
| 5,018,755 A | 5/1991 | McNeilus et al. | 280/81.1 |
| 5,090,495 A | 2/1992 | Christenson | 180/24.02 |
| 5,121,808 A | 6/1992 | Visentini et al. | 180/435 |
| 5,149,126 A | 9/1992 | Brennan | 280/86.5 |
| 5,326,128 A | * 7/1994 | Cromley, Jr. | 280/656 |
| 5,370,196 A | 12/1994 | Bishop | 180/24.02 |
| 5,411,287 A | 5/1995 | Henschen | 280/124.169 |
| 5,458,355 A | 10/1995 | Young | 280/405.1 |
| 5,464,243 A | 11/1995 | Maiwald et al. | 280/638 |
| 5,489,113 A | 2/1996 | Torborg | 280/638 |
| 5,498,021 A | 3/1996 | Christenson | 280/86.5 |
| 5,505,481 A | 4/1996 | VanDenberg et al. | 280/81.1 |
| 5,516,135 A | 5/1996 | Christenson | 280/405.1 |
| 5,540,454 A | 7/1996 | VanDenberg et al. | 280/86.5 |
| 5,549,322 A | 8/1996 | Hauri | 280/86.5 |
| 5,597,174 A | 1/1997 | Christenson et al. | 280/86.5 |
| 5,713,424 A | 2/1998 | Christenson | 180/24.02 |
| 5,718,443 A | 2/1998 | St. Onge | 280/405.1 |
| 5,810,377 A | 9/1998 | Keeler et al. | 280/96.1 |
| 5,823,629 A | 10/1998 | Smith et al. | 298/23 R |
| 5,865,452 A | 2/1999 | Chalin | 280/124.125 |
| 5,897,123 A | 4/1999 | Cherney et al. | 280/86.5 |
| 6,189,901 B1 | 2/2001 | Smith et al. | 280/86.5 |
| 6,206,125 B1 | 3/2001 | Weddle | 180/208 |
| 6,247,712 B1 | 6/2001 | Smith et al. | 280/86.5 |
| 6,371,499 B1 | * 4/2002 | Konop | 280/86.5 |
| 6,416,136 B1 | 7/2002 | Smith | 301/128 |
| 6,419,247 B1 | * 7/2002 | Moran | 280/86.5 |
| 6,435,526 B1 | * 8/2002 | Karlsson | 280/86.5 |
| 6,471,223 B1 | * 10/2002 | Richardson | 280/86.5 |
| 6,536,550 B2 | * 3/2003 | Schmidt et al. | 180/209 |
| 6,550,798 B2 | * 4/2003 | MacKarvich | 280/149.2 |

* cited by examiner

Primary Examiner—S. Joseph Morano
Assistant Examiner—Jason R. Bellinger
(74) Attorney, Agent, or Firm—Pate Pierce & Baird

(57) ABSTRACT

A lightweight axle assembly may include a bracket at each end thereof for receiving a mount at one of a plurality of positions thereon. The mount may include a standoff for spacing an actual wheel assembly a suitable distance from the bracket. The axle may be formed to include a beam for suitable cross section including I-beams, channels, or boxes, as well as cylindrical tubes. Wheels may be mounted to spindles rigidly attached, to driving axles contained within the axle assembly, or to kingpins secured to the mounts. The axle may be adjusted to accommodate a broad range of suitable, relative, distances between the mounting surface (top or bottom of the axle end) and the center line of a wheel assembly associated with the axle. Forged mounts may be manufactured to accomplish structural objectives. Meanwhile, areas of less stress may be fabricated from lighter materials of various unconventional configurations.

31 Claims, 9 Drawing Sheets

LIGHTWEIGHT, ADJUSTABLE-HEIGHT, AXLE

RELATED APPLICATIONS

This Patent Application is a continuation of U.S. patent application Ser. No. 09/511,596 filed on Feb. 23, 2000, which issued Jul. 9, 2002 as U.S. Pat. No. 6,416,136 B1 entitled LIGHTWEIGHT, ADJUSTABLE-HEIGHT, AXLE.

BACKGROUND

1. The Field of the Invention

This invention relates to equipment for trucks and, more particularly, to novel systems and methods for providing adjustable axles for trucks.

2. The Background Art

Highway construction and maintenance is a matter of substantial concern to local, state, and federal governments. Road construction has always been an expensive proposition. Roads constructed using modern knowledge, methods, and technology have greatly improved the load-bearing capacity of vehicles traveling over those roads.

Specific limitations exist on loading of vehicle axles. It is well established that bridges are designed to carry specific weights. However, in actual bridge design, several additional, localized factors exist. For example, bridges may have one or more surfacing materials, such as concrete or asphalt. The surfacing materials may be designed in various compositions to support various loads and provide predictable durability. However, underlying a bridge or road surface is a structure of specific members each designed for supporting a particular maximum force or load.

Bridges in various parts of a roadway system have varying weight-carrying capacities. A truck having weight over some number of axles, must also have those axles distributed across a suitable length of the bridge in order to distribute the load of the truck properly over the individual structural members of the bridge.

Thinking in terms of a truck, not as a truck, but as a series of axles, each bearing a load, one sees another important factor in the mutual design criteria between vehicles and roadways (e.g. bridges). That is, axles cannot be separated from the truck. The truck has a length; therefore, axles cannot be completely separated from each other. Therefore, all of the axles of the truck will pass over the bridge together. The truck has to distribute axles over some maximum length.

Moreover, the construction of all bridges, streets, highways and roads provides for specific limitations on sustainable loads and the like. For example, just as building construction must start far below the surface level of the earth to support a foundation, many road beds must be deeply laid to provide acceptable sustainable loads. Above a road bed are laid various types and grades of materials. Ultimately, a surface material is provided on which vehicles roll directly.

Pneumatic tires, in addition to improving a vehicle's ability to absorb shocks from the roughness of a surface, distribute the load of the vehicle over a surface area of a road surfacing material. Tire pressures relate directly to the distortion of a tire in order to present a certain amount of area onto a road for supporting the weight of the vehicle. For example, a four thousand pound vehicle having a total of fifty square inches of tire surface to the road must have a tire pressure of approximately twenty pounds per square inch to support the load. To support the same load or weight of a vehicle at forty pounds per square inch only twenty-five square inches of tire tread must be in contact with the road. Thus, local pressure on a road surface may be controlled, to a certain extent, by the inherit limits on tire pressures.

The distance between a vehicle's axles is another factor in load distribution on a road bed. For example, two axles spaced relatively closely together will produce more load in a road bed than the same two axles, carrying the same loads, but spaced further apart. Thus, axle location may be very important in determining the local force presented on a bridge or a road bed by a particular axle. In this context, an axle may be used to refer to the axle itself, or to the axle and tires as they represent force application to a road bed from a vehicle supported thereby.

The regulated carrier industry includes many types and classes of trucks. Trucks require both operable hardware and regulatory compliance. Trucks must comply with weight and dimensional limits for roads and especially bridges. Meanwhile, unnecessary wear is avoidable if unused portions, such as unneeded auxiliary axles, of a truck may be disengaged. For example, the basic structure of a truck includes a steering axle and a drive axle mounted to a frame supporting a cab and a bed. Drive wheels may be arranged as duals, tandems, or dual tandems.

In certain circumstances, auxiliary axles may benefit a truck. Auxiliary axles provide load-bearing capacity that may be installed to operate permanently or selectively. Auxiliary axles may be positioned to lead the drive wheels, follow the drive wheels, or trail the entire vehicle. Often the requirement to selectively distribute the load on road beds and bridges drives the positioning of auxiliary axles. Suspension systems may vary depending upon the mounting arrangement of any axle on a truck. Moreover, axles that must be engageable selectively may require their own particular adaptations to meet with the manufacturer's specifications for the frame of the truck.

Trucks today may be manufactured to have tandem axles spaced a comparatively long distance apart, as compared with trucks of previous years. Also, many trucks now carry auxiliary axles that can be engaged for distributing a load along a different length of the truck. For example, long truck bodies or trailers may have wheels located nearer the front end, rather than leaving the entire weight distributed between a front axle and a rear axle or between a tractor and a pair of closely spaced tandem axles at the rear.

Auxiliary axles are often added to concrete mixer trucks to accommodate limitations on bridge weights. Also, auxiliary axles may be added to accommodate the large differential load between an empty truck and a loaded truck. Thus, auxiliary axles may be engaged for a limited time, only while a vehicle is loaded and is traveling on a road. At a work site, a truck may not need auxiliary axles as a support for the vehicle itself, and may disengage them.

Thus, heavily loaded trucks having changes in load actually applied thereto, may need auxiliary axles. Those axles need to be distributed along a maximum length, and may need to be distributed along the vehicle itself. To protect roadways, to satisfy bridge weight limitations, and to support substantial loads, auxiliary axles may be used in vehicle construction.

Truck manufacturers may regard axles of all types as materials. That is, a truck manufacturer may simply purchase axles from a suitable, available supplier. A truck design may be built to accommodate the particular dimensions of a preferred or suitable axle available from a known manufacturer. Not every truck is, however, custom designed.

Often, a manufacturer or purchaser of a truck may desire to install a nonstandard axle, such as an auxiliary axle, in order to satisfy a particular need of a particular customer. The customer's needs may be driven by the task to be performed by the truck and the specific limitations on loading of axles applicable to the geographic region in which the truck will be operated.

Inventory is a perennial problem for manufacturers. If a manufacturer produces a comparatively broad range of designs of trucks, a correspondingly broad range of axle designs may be required. Many designs are sensitive to axle height, as compared to truck frame height. The required suspension system mounting the axle assembly to a truck frame must also be taken into consideration.

Accordingly, it would be an advance in the art to reduce inventories and design commitments by providing both principal and auxiliary axles adaptable to fit a plurality of vehicle heights. Moreover, it would be an advance in the art to provide an axle assembly that could be inventoried for a truck design, the corresponding frame height thereof, and the particular suspension desired, before all decisions concerning the dimensions of the suspension system and the truck frame height have been determined.

Thus, an axle design that provides an adjustable, relative height between the center line of the associated wheels and the mounting surface of the axle with respect to a suspension system, would reduce inventory, reduce cost, and provide design flexibility. Design flexibility can be very important, since the more factors that may be determined at a later time, the more custom performance may be provided. That is, intransigent requirements driven by an inflexible design parameter associated with a particular component of a vehicle may drive costs upward for other features of the vehicle. Moreover, incompatibilities between components require specialized combinations that must be designed, documented, maintained, and so forth in order to support a production line thereof.

BRIEF SUMMARY AND OBJECTS OF THE INVENTION

In view of the foregoing, it is a primary object of the present invention to provide adjustable height for auxiliary axles, and principal axles of a truck. It is contemplated that an apparatus and method in accordance with the invention may provide any principal axle (steering axle, drive axle) or auxiliary axle (leading axle, following axle, trailing axle) with a suitable range of adjustment for the relative height between the top mounting surface of the axle and the centerline of the associated wheels installed thereon.

Consistent with the foregoing objects, and in accordance with the invention as embodied and broadly described herein, a method and apparatus are disclosed in one embodiment of the present invention as including an axle structure provided with a bracket for securing a mount thereto. Apertures in the bracket and mount may be positioned to match at a plurality of positions. Thus, fasteners may secure the mount to the bracket on each end of the axle at multiple relative positions therebetween.

A standoff may be provided with the mount, for spacing a wheel assembly a distance away from the end bracket of the axle. Various sizes of tires and wheels may be accommodated by the adjustability between the mount and the bracket of the axle.

The axle may mount to a frame of a vehicle by various mechanisms. A conventional suspension system may secure the axle to the vehicle frame, or a "pusher" assembly for selectively engaging the axle may be relied upon. In certain embodiments, a swing arm may mount a trailing axle to a vehicle.

The axle may be formed as a beam of any suitable configuration, including an I-beam, a channel, a box beam, a right circular cylindrical tube, or the like, as a like. Various struts, gussets, fasteners, and the like may secure the brackets to the axle, and the mounts to their respective standoffs for supporting the axle on a vehicle, and the wheels with respect to the axle, respectively. In one embodiment, the mounting hardware for connecting an axle to a vehicle may be integral to the axle. In an alternative embodiment, the axle may be integrally constructed with the suspension system to further reduce weight. Accordingly, the adjustable standoffs for the wheel assemblies may be adjusted to fit the vehicle supported by the apparatus.

Wheel assemblies may be connected to the mount associated with an axle by means of kingpins, axles, drive axles, fixed spindles, or the like. Thus, a wheel assembly may serve as a driver, a steering assembly, or an auxiliary assembly. Also, a wheel assembly may function as a caster on a kingpin connected to a mount and bracket associated with an axle.

In certain embodiments, tie rods may connect wheels that caster or turn, and may connect to dampers (hydraulic or pneumatic buffers) for reducing oscillations.

Universal joints may connect drive axles to axle stubs or spindles driving wheel assemblies. Accordingly, a differential may be provided within an axle in accordance with the invention, having drive axles contain therein for driving connected wheel assemblies. Thus, an axle assembly in accordance with the invention may serve as a principal steering axle of a vehicle, a drive axle of the vehicle, an auxiliary leading or following axle or as a trailing axle, having castered or noncastered wheels mounted thereto.

The standoff assembly may be straight, angled, offset (vertically or horizontally), shimmed (vertically or horizontally), hollow, filled, or the like, in accordance with the desired functionality for the wheel assemblies connected to the axle. Thus, a standoff may position a drive wheel a distance away from a bracket of an axle, both horizontally and vertically, in order to accommodate vehicle size, axle size, suspension dimensions, and any requirement for mobility (e.g. U joints and drive-ins).

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
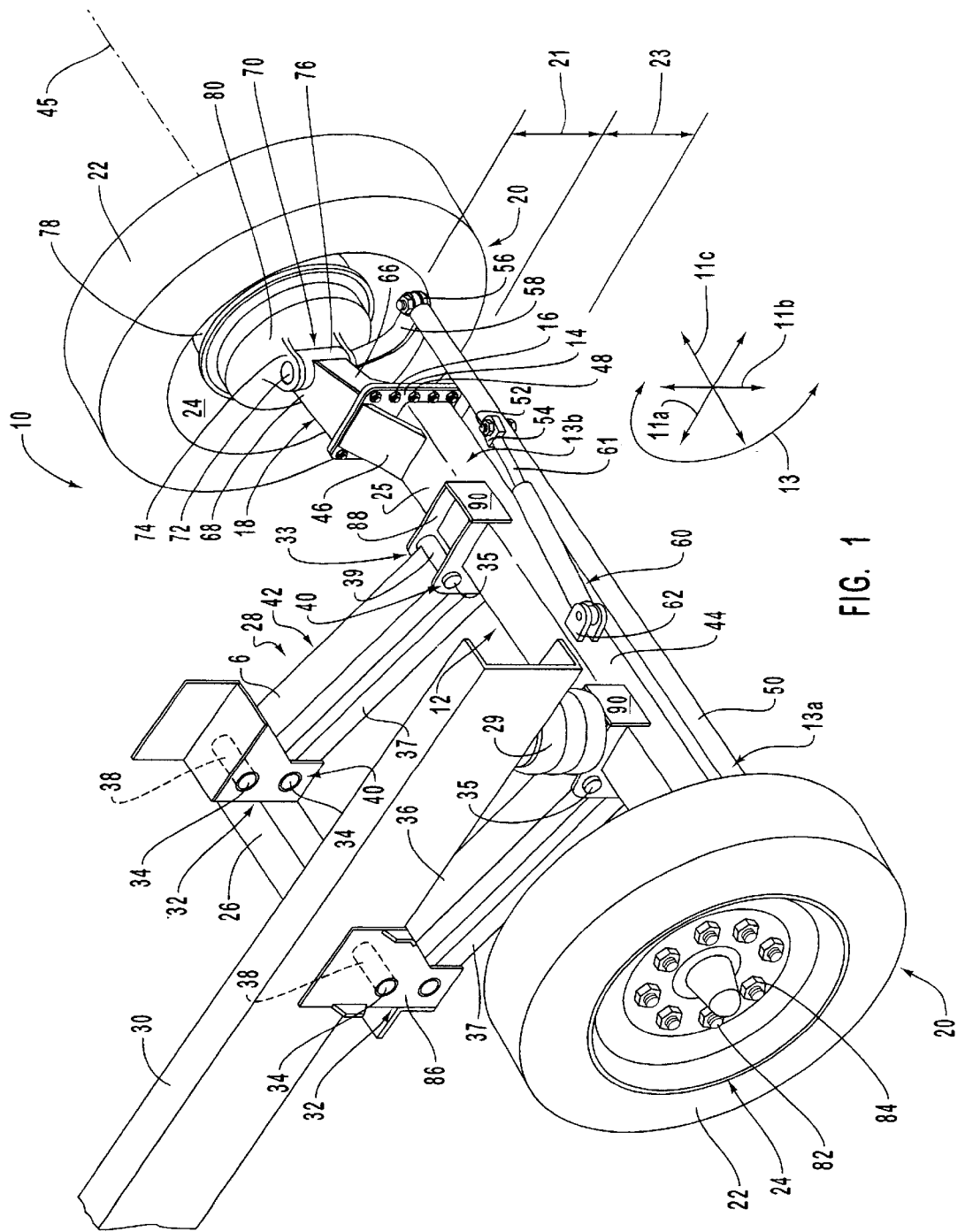
FIG. 1 is a rear quarter perspective view of an axle assembly attached to a frame of a vehicle, in accordance with the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. FIGS. 1–9 illustrate certain presently preferred embodiments of apparatus and methods in accordance with the invention. Those of ordinary skill in the art will, of course, appreciate that various modifications to the detailed schematic diagrams may easily be made without departing from the essential characteristics of the invention, as described. Thus, the following description of the Figures is intended only by way of example, and simply illustrates certain presently preferred embodiments of the invention as claimed herein.

Referring to FIGS. 1–9, generally, and specifically to FIGS. 1–5, an apparatus 10 may be configured as an axle assembly or an auxiliary axle assembly. That is, vehicles require wheels. Wheels require axles. Axles are mounted to vehicles by suspension systems. Principal axles include at least one drive axle and a steering axle. The steering axle supports rotating steering wheels and tires. The drive axle supports rotating drive wheels and tires. In accordance with certain embodiments of an apparatus and method in accordance with the invention, an apparatus 10 may provide an axle 12 provided with a bracket 14 attached to first and second ends 13a, 13b, respectively.

Each bracket 14 may be configured to be flat, curved, uniquely shaped, or the like, in order to receive a mount 16. In one embodiment a bracket 14 may be penetrated by several apertures 15. The apertures 15 may be aligned in one or more rows suitable for substitution one for another in receiving a fastener.

Similarly, the mount 16 may be provided with several apertures 17 aligned in one or more rows. The apertures 17 may be matched to the apertures 15, for positioning the mount 16 at one of several suitable attachable positions with respect to the bracket 14.

In practice, the apparatus 10 has corresponding operational directions that may be referred to for convenience, as a longitudinal direction 11a, a transverse direction 11b, and a lateral direction 11c. The longitudinal direction 11a does not refer to the length of the axle 12, but rather a longitudinal direction corresponding to forward and backward with respect to a vehicle to which the axle 12 and the apparatus 10 may be secured.

In some selected embodiments, the apertures 15, 17 may be arranged in rows extending along a transverse direction 11b. Accordingly, the apertures 15 may be matched with selected apertures 17 for securement of the mount 16 to the bracket 14 at a selected position. The bracket 14 and the mount 16 need not be of the same dimension in a transverse direction 11b. For example, in order to provide a larger number of apertures 15, 17 that may be matched, while providing a greater bearing length of engagement between the bracket 14 and mount 16, the transverse direction 11b of either the bracket 14, or the mount 16, may be longer than the other.

A standoff 18 may extend in any direction 11a, 11b, 11c suitable for positioning a wheel assembly 20 with respect to the axle 12. In certain embodiments, a wheel assembly 20 may be mounted to pivot from a location some substantial distance from a centerline 19 of the axle 12. In certain embodiments, one may think of the longitudinal direction 11a as corresponding to the forward and backward, nominal horizontal, direction, the transverse direction 11b corresponding to the nominal vertical direction, and the lateral direction 11c corresponding to a side-to-side horizontal direction. Nevertheless, all naming conventions for the directions 11a, 11b, 11c are merely for convenience and reflect no absolute orientation in space being required necessarily.

Thus, a standoff 18 may typically position a wheel assembly 20 above a centerline 19 of an axle 12, in order to provide a maximum clearance 21 between the axle 12, and the frame 30 of a vehicle.

Likewise, the size of a tire 22 and wheel 24 rotating about the mount 16, compared with a desired ground clearance 23 between a mounting position 25 of the axle 12, and a surface on which the tire 22 of the wheel assembly 20 rolls.

A framing member or beam 26 (e.g. cross beam 26) may support a mount 28 for the axle 12. The beam 26 may be a part of the frame 30 of a vehicle. Nevertheless, the overall clearance 21, 23 may be accommodated by adjusting the mounts 16 in a transverse direction 11b with respect to the brackets 14. The clearance 21 provides for a suspension system 29, such as an air bag 29 or other load bearing mechanism 29, that may be used to support the vehicle frame 30 above and against the axle 12. In the case of the embodiment illustrated in FIG. 1, the axle 12 is a trailing axle 12. Nevertheless, in other embodiments, the axle 12 may be mounted directly below the frame 30 of a vehicle, in order to provide either principal axle functions, or auxiliary axle functions.

In a trailing axle configuration, brackets 32 may mount to structures that may or may not be part of the organic frame 30 of a vehicle. In the illustrated embodiment, the brackets 32 include an L-shape for fitting the vehicle frame 30 directly. The brackets 32, pivotably mounting the axle 12 to the frame 30, correspond to rear brackets 33 secured directly to the axle 12. Pins 34, 35 support pivoting or limited rotation by the arms 36, 37 with respect to the frame 30, as well as with respect to the axle 12.

In certain embodiments, the pins 34, 35 may be inserted through journals 38, 39 or bushings 38, 39 adding additional bearing surface area against the pins 34, 35, above the structural requirements dictating the materials and thicknesses of the arms 36, 37. Thus, although the structural requirement for the arms 36, 37 may require only a comparatively thin wall, the pressure stresses from bearing the load supporting the frame 30 by the axle 12, may urge the benefit of journals 38, 39 on a designer.

Thus, the brackets 32, 33 and, together with the pins 34, 35 and the journals 38, 39 form a pivot assembly 40. In one embodiment, the arms 36, 37 may be included as part of the pivot assembly 40. Thus, a pivot assembly 40 provides for a substantially constant orientation in a circumferential direction 13 of the axle 12, while providing substantial freedom to move in a transverse direction 11b.

Meanwhile, the overall swing arm assembly 42 certainly includes in its structure the brackets 32, 33, the pins 34, 35, or their equivalents, the arms 36, 37, and the journals 38, 39. Pivot assemblies 40 resist any translation in a lateral direction 11c by the axle 12 with respect to the frame 30, and permit only a certain, limited, arcuate motion, contributing to the movement of the axle 12 in a longitudinal direction 11a with respect to the frame 30. Thus, the axle 12 is supported to move in substantially a single direction 11b in response to roughness of a road, and the absorption of shocks associated with displacement of the axle 12 with respect to a road surface, and a vehicle frame 30.

In certain embodiments, the axle 12 may be formed to have a beam 44. The beam 44 may be configured as an I-beam, a channel beam (C-beam), and H-beam, a right circular, cylindrical, tubular beam, or a rectangular beam of some suitable cross-section. The beam 44 supports primarily a bending load due to support of the vehicle frame 30 by the axle 12, through the suspension system 42, a swing arm suspension system 42, in the embodiment illustrated in FIG. 1.

In certain embodiments a strut 46 or gusset 46 may secure a bracket 14 to the axle 12 in order to support offset. For example, in certain embodiments a road axle 12, is desirable. Nevertheless, in many commercial vehicles, a comparatively large-diameter, off-road tire 22 is desirable. To reconcile these two issues, the axle 12 may be dropped with respect to a center line 45 of a tire 22 and a wheel 24. Thus, a bracket 14 may extend a substantial distance in a transverse direction 11b above the axle 12. Accordingly, a strut 46 of suitable structural materials and directions, may strengthen attachment of the bracket 14 to the axle 12. Likewise, for suitably fitting a vehicle to a tire stance, an offset may be desirable in a transverse direction 11b, lateral direction 11c, or both. As illustrated and explained hereafter, the apparatus 10 is adaptable to such variations due to its modular nature.

The bracket 14 may be secured to the mount 16 and vice versa, by fasteners 48. The fasteners 48 may be removable or permanent. For example, permanent fasteners 48 may include rivets, welds, or other specialized fasteners. By contrast, removable fasteners 48, or selectively removable fasteners 48 may include bolts, clamps, and the like. Typically, the threaded fasteners 48 such as the bolt 49 and the corresponding nut 47 may be readily and selectively secured and removed from the bracket 42 and mount 16. A selective number of fasteners 48 may be required. Similarly, a certain number of apertures 15, 17 may be required to be engaged with one another, in order to provide sufficient bearing distance to support bending loads exerted by the wheel assembly 20 and standoff 18, through the mount 16, against the fasteners 48 connecting to the bracket 14. Thus, to prevent bending of the bracket 14 or mount 16, in service, a sufficient bearing distance may be specified, and only a limited number of fasteners 48 may be removed. Likewise, a limited number of apertures 15, 17 may be required to be engaged, or permitted to be unused.

In certain embodiments, the wheel assemblies 20 secured to each end 13a, 13b of the axle 12 may be configured to function as casters with respect to the axle 12. A tie rod 50 may connect the wheel assemblies 20 for cooperative tracking. In certain embodiments, to provide greater stability in dynamic environments, bolts 52 and brackets 54, or the like, may secure a damper 60 to the tie rod 50. A damper 60 may resist relative motion between an actuator 61 secured to the tie rod 50, and a mounting bracket 62 of the damper 60 secured to the axle 12. Thus a damper may resist motion of the tie rods 50 in a lateral direction 11c, damping against chatter.

Damper types may include a dashpot, viscous drag system, hydraulic cylinder, brake, buffer, or the like. A damper 60 may be hydraulic, pneumatic, or a combination device. Damping may be comparatively strong, comparatively weak, or non-existent. Nevertheless, damping has been found effective in reducing chatter of castered wheel assemblies 20 in actual operation.

The tie rod assembly 50 may be secured to the wheel assemblies 20 by knuckles 56 and arms 58. The arm 58 may serve as a lever in order for the tie rods 50 to pivot each wheel assembly 20 about an axis extending in substantially a transverse direction 11b. Actually, an axis of rotation or a pivot axis for a wheel assembly 20 will be dictated by requirements of caster, camber, and other alignment factors associated with the wheel assemblies 20.

Continuing to refer to FIGS. 1–9, and more particularly to FIGS. 1–5 a beam 44 may constructed to have one or more webs extending in a direction substantially corresponding to a plane containing the transverse 11b and lateral directions 11c. In general, a web 66 may extend substantially as a vertical plane. Again, directions are only by way of an example, and not an absolute orientation. A web 66 or multiple webs, may be configured as side plates 66 and, in any event, may extend away from one or more flanges 68. In certain selected embodiments, two flanges may flank a web 66. Thus, flanges 68 may be configured as top and bottom plates 68.

Note that the standoffs 18 may also be configured as beams 44 having one or more webs 66, and one or more flanges 68. In one embodiment, the standoff 18 may include a web 66 or multiple webs 66, having a variation in cross-section along a lateral direction 11c. For example, a web 66 of the standoff 18 may be cut away in order to provide operating clearance for the lever arm 58 associated with the tie rod assembly 50.

In one embodiment, the flange 68 may be formed so as to include a broken flange 69. The broken flange 69, is not actually broken, rather, the flange portion 69 extends in a plane or as a surface intersecting the basic flange 68. Accordingly, the flanges 68, 69 accommodate the change in cross-section of the webs 66 of the standoff 18. To the extent that a wheel assembly 20 should pivot with respect to the standoff 18 and axle 12, a kingpin assembly 70 may support pivoting. In one embodiment, a kingpin 72 may penetrate a yoke 74 corresponding to a spindle assembly supporting the wheel assembly 20. Although the spindle is not shown, a spindle serves as the member supporting bearings and rotation of a tire 22 and wheel 24 with respect to the kingpin 72 and the axle 12. Accordingly, a yoke 74 may capture a bushing 76. The bushing 76 may capture, together with the yoke 74, the kingpin 72 extending therebetween. An aperture 77 may penetrate the bushing 76 for receiving the kingpin 72 therethrough.

The wheel assembly 20 may be provided with a brake drum 78 for braking the wheel assembly 20 with respect to the axle 12. A spindle plate 80 may extend into the break drum 78, supporting the spindle about which the tire 22 and wheel 24 rotate. A wheel 24 may be secured to the brake drum 78 or a turntable associated therewith, typically a hub, by lugs 82. Nuts 84 secured to the lugs 82 may secure the wheel 24 in position.

In general the apparatus 10 may be configured to operate as a principal axle or an auxiliary axle. Accordingly, a suspension system may be selected from any type of suspension system suitable for mounting the axle 12 to a frame 30 of a vehicle. In one embodiment, the apparatus 10 may be a trailing axle 12. Similarly, however, a pivotable mount directly to a frame 30 may also lower the axle 12 from a position proximate the frame 30 to a peak position comparatively proximate the ground. Plates 86, or similar brackets 86, may secure a swing arm assembly 42 to the frame 30. An intermediate structure 26 devoted to the apparatus 10, may or may not be appropriate. The frame 26 may actually be a portion, such as a cross-member 26, of the organic vehicle frame 30.

Likewise, plates 88 or brackets 88 securing the axle 12 to a suspension system may be formed by any suitable means. In the embodiment illustrated, stiffeners 90 are secured to plates 88 in order to create a box-like effect, adding stiffness and strength.

Figure 2:
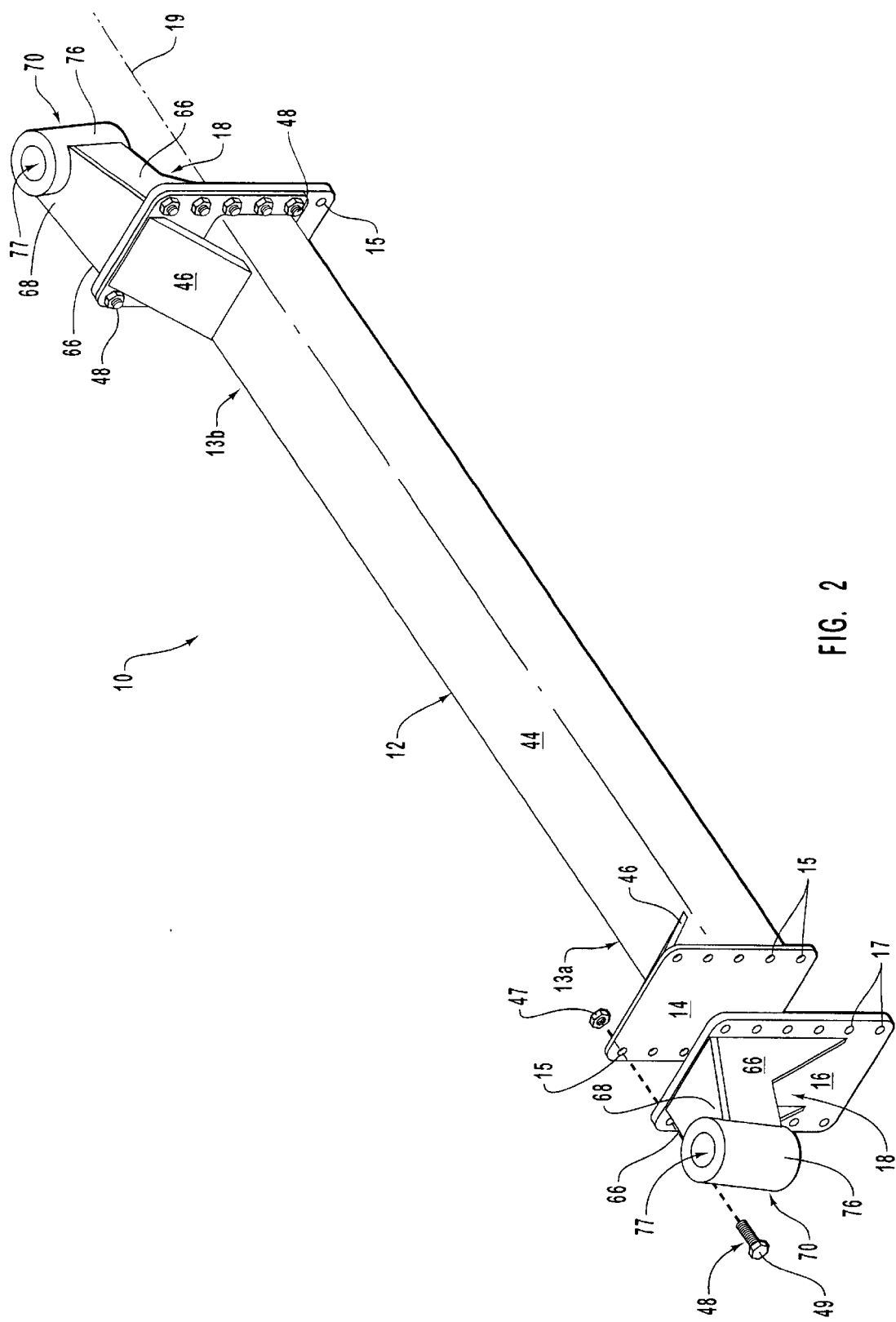
FIG. 2 is a rear quarter perspective view of the axle assembly of the apparatus of FIG. 1.
Figure 3:
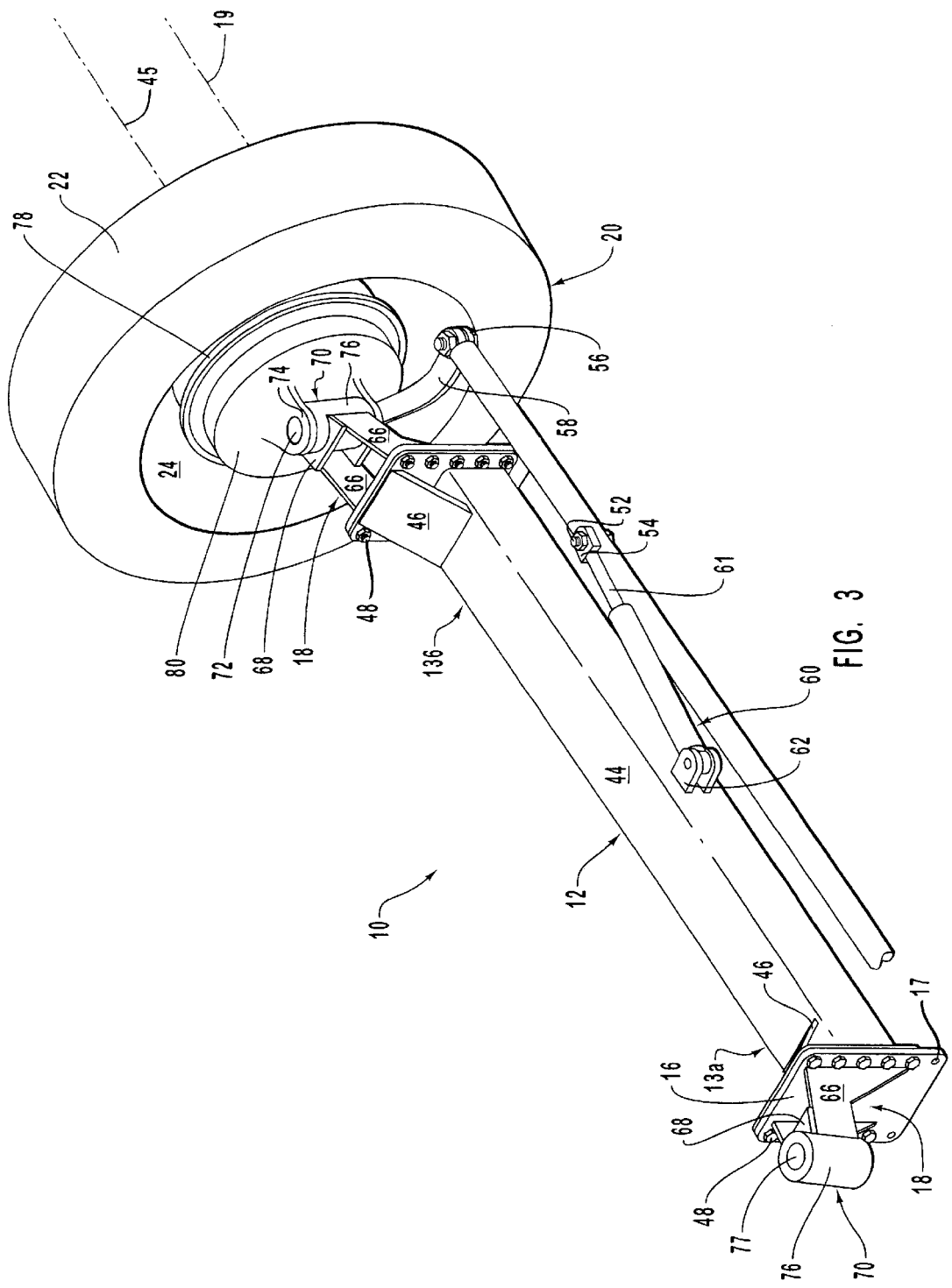
FIG. 3 is rear quarter perspective view of the apparatus of FIGS. 1–2 having one wheel assembly and king pin removed for clarity.
Figure 4:
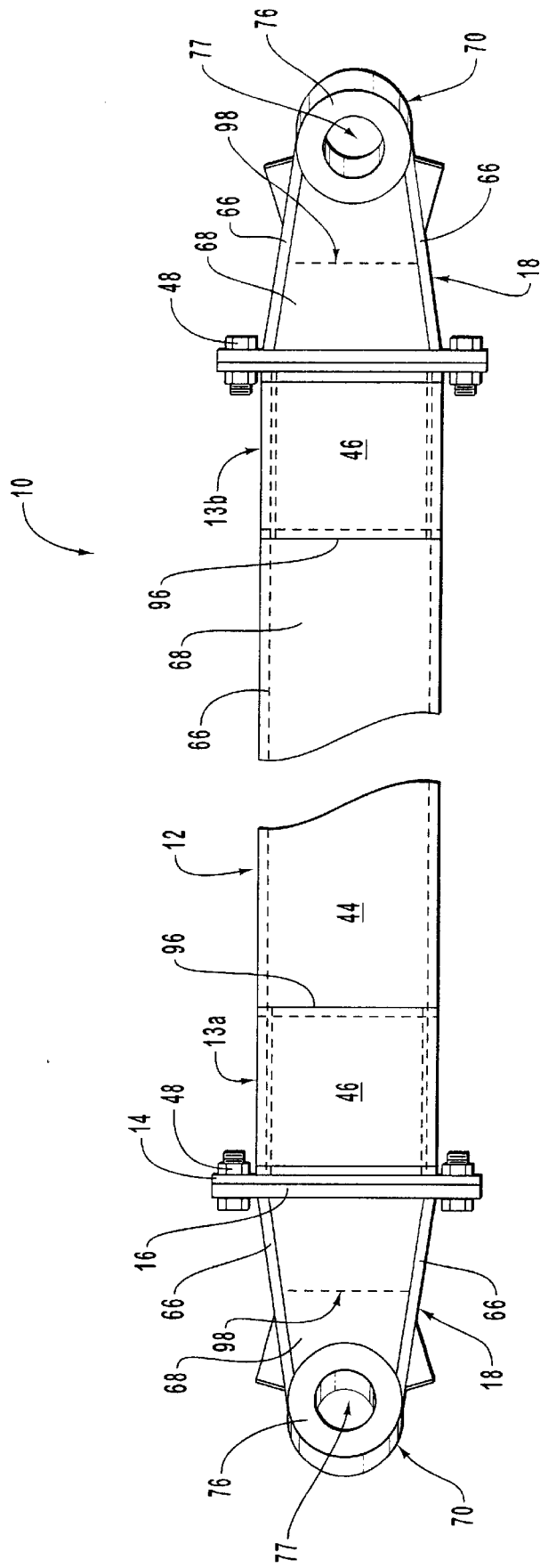
FIG. 4 is a top plan view of the axle assembly of FIGS. 1–3.
Figure 5:
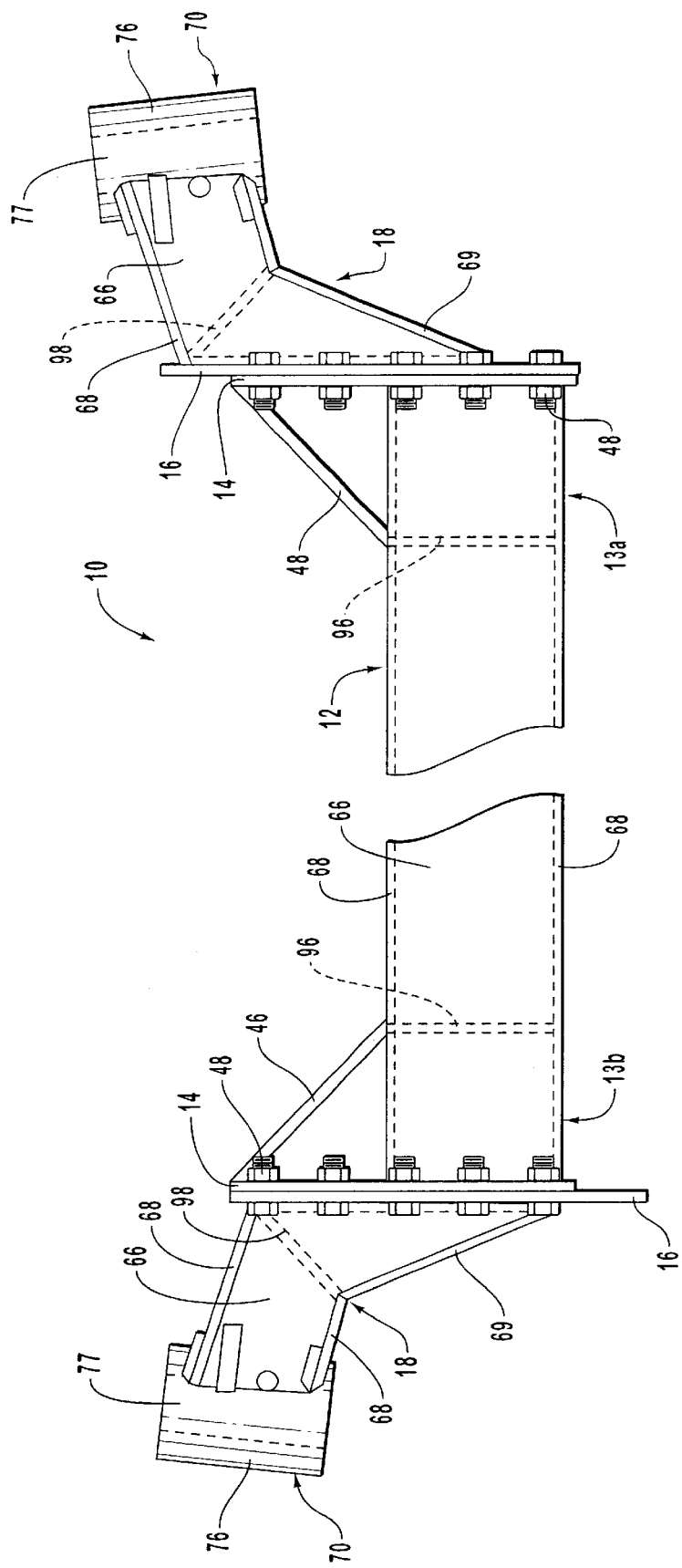
FIG. 5 is a front elevation view of the apparatus of FIGS. 1–4.

Referring to FIGS. 4–5, while continuing to refer generally to FIGS. 1–9, an axle 12 may be fabricated from conventional metal sections, or may be fabricated into the beam structure 44 of the axle 12. In one embodiment, an anchor plate 96 may cross between the webs 66 of the beam 44, or between the flanges 68 of the beam 44, or between all four. The anchor plate 96 may be solid, or may be relieved near corners, along certain sections, and the like, as may be advisable to optimize stress management in the beam 44. In the illustration of FIGS. 4–5, the anchor plate 96 may be positioned to directly support the strut 46 connected to the bracket 14. Although the brackets 14 and the mounts 16 are illustrated as flat plates 14, 16, curvature may be appropriate in certain circumstances. Likewise, a V-shaped, or other cross-sectional surface may serve to stiffen, strengthen, lock, align, or the like, the mount 16 with respect to the bracket 14.

Just as the anchor plates 96 may stiffen the beam 44 and support the struts 46, a stiffener 98 may strengthen the standoffs 18. As a practical matter, a stiffener 98 may also triangulate between certain of the flanges 68, and the mount 16 secured to the bracket 14.

In certain embodiments, the flanges 68 may extend between the bushing 76 and the mount 16. Nevertheless, as illustrated in FIGS. 1–3, the flanges 68 may be partial, according to the weight, stress, and access considerations.

Figure 6:
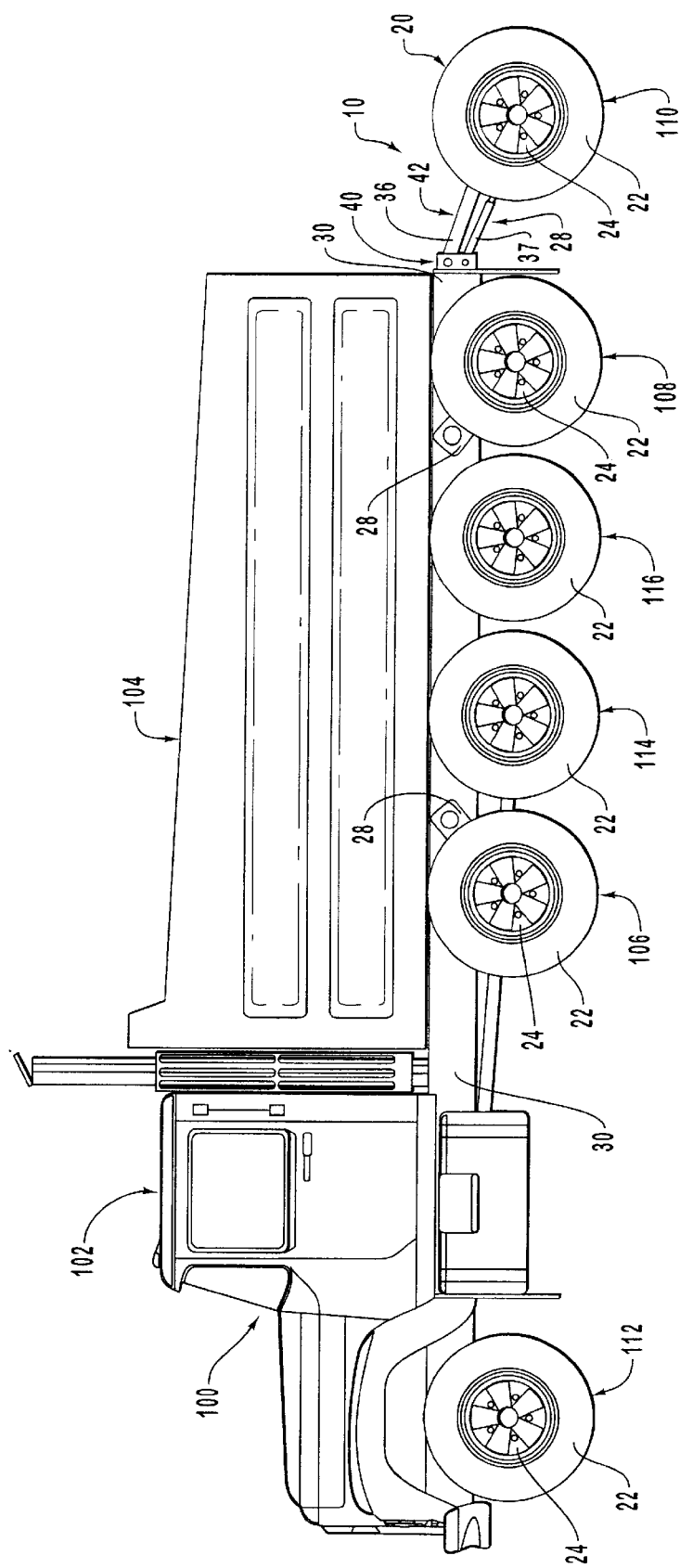
FIG. 6 is a side elevation view of a truck having six axles, any one of which may be an axle in accordance with the invention singly or in any combination.

Referring to FIG. 6, a vehicle 100 may include a bed 30, a cab 120 mounted thereon, and a bed 104 supported thereby. The vehicle 100 may include multiple axles 106–116. For example, the vehicle 100 may be equipped with a leading auxiliary axle 106. A following auxiliary axle 108 may be added alone, or in combination with the leading auxiliary axle 106. In a combination with the auxiliary axles 106, 108 both 106, 108, or alone, the auxiliary axle 110 may trail vehicle 100 on a swing arm 42 supported by suitable suspension methods. For example, springs, shackles, air bags, hydraulic systems, and the like may support the loads between an axle 12 and the frame 30.

In certain embodiments, an axle 12, or the apparatus 10 may be installed as the steering axle 112. In other embodiments, an axle assembly 10 in accordance with the invention may be installed as the forward drive axle 114, the rear drive axle 116, or both. Thus, relying on the adaptability of the transverse adjustment of the clearance 23 of the axle mounting surface 25 above an operating surface, the axles 106–116 may all be of a type contemplated within the scope of the invention, each adjusted at an appropriate position for the application for which it is designed and installed.

Figure 7:
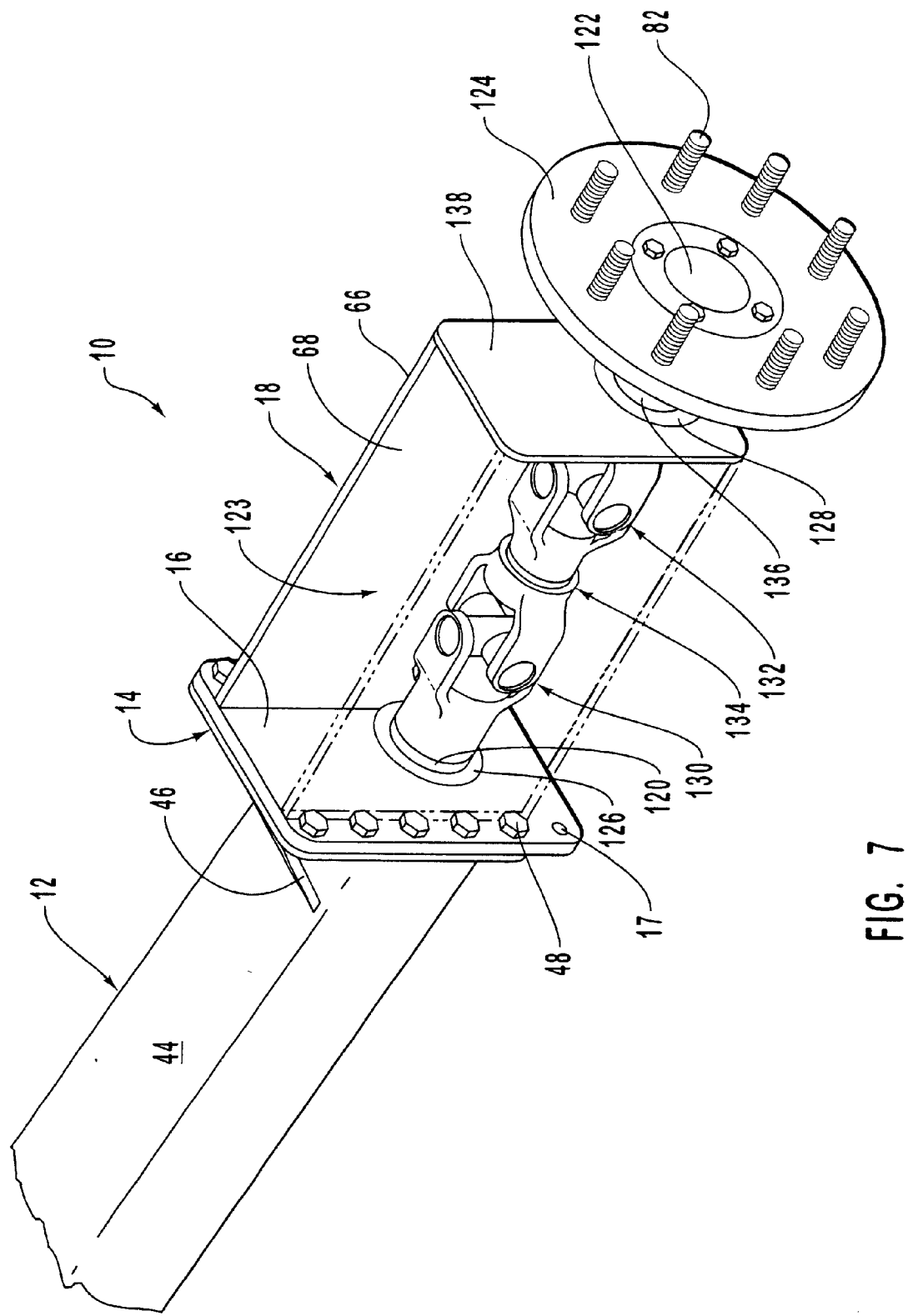
FIG. 7 is a rear quarter perspective view showing a portion of a standoff in phantom in order to demonstrate an optional drive linkage for driving a wheel assembly supported by an axle in accordance with the invention.

Referring to FIG. 7, while continuing to refer generally to FIGS. 1–6, an apparatus 10 having an axle 12 with the corresponding bracket 14 and mount 16 may include a standoff 18 extending either straight in a lateral direction 11c, or extending in a lateral direction 11c, while angling upwardly or downwardly along a transverse direction 11b. A drive axle 120 may be encased in the axle 12, and driven by a differential associated therewith. Accordingly, a hub 122 may connect a wheel assembly 20 to a drive axle 120. In certain embodiments, an optional drive knuckle 123 may facilitate offsetting the hub 122 from the drive axle 120. Accordingly, a hub 124 connecting to a wheel assembly 20 may be displaced from the mount 16 a suitable distance. Meanwhile, bearings 126 associated with the axle 12 may be scaled to support a differential connected to the axle 12. Likewise, bearings 128 may support rotation of the hub 122 at the wheel end of the standoff 18.

In one embodiment, a first universal joint 130 may provide rotational power taken from the drive axle 120 and aligned therewith. A second universal joint 132 may deliver power to the hub 122, accommodating the difference in alignments between the hub 122, and a drive shaft 134 connected to the first universal joint 130. A spindle 136, or a stub axle 136 may rotate in the bearing 128, supporting the hub 122. A faceplate 138 or bulkhead 138 may be formed in any suitable shape to support a bearing 128 and axle 136 or spindle 136. Accordingly, the wheel 24 may mount to the face plate 124, secured by the lugs 82. Accordingly, the wheel assembly 20 may rotate with the axle 136, driven at the rotational velocity or angular velocity of the drive axle 120, but offset at a different position, in all three dimensions of space, as well as at any suitable angle deemed appropriate for proper tracking of the wheel assembly 20.

The standoff 18 may also serve as a gear box, transfer case, or the like. For example, in addition to the drive knuckle assembly 123, gear reductions and the like may be provided in the standoff 18. Accordingly, the standoff 18 may be sealed to support an oil bath, or simply to prevent debris from interfering with the smooth operation of the drive knuckle assembly 123.

The drive knuckle assembly 123 is by no means required. For example, a drive axle 120 may simply be carried in a floating bearing 128 positioned by the bolts 48 securing the mount 16 to the bracket 14. In another embodiment, where the wheel assembly 20 is not a drive wheel (e.g. see the drive axles 114–116), a spindle 136 may be fixed with respect to the standoff 18. That is, the spindle 136 may be identical to a coasting wheel assembly 20, such as is used in a conventional, non-powered steering axle 112. Thus, a castering wheel assembly 20 may be secured as illustrated in FIGS. 1–3, yet a leading auxiliary axle 106 and a following auxiliary axle 108 need not caster. In fact, castering may be problematic, depending on space, alignment, terrain, and other considerations.

Figure 8:
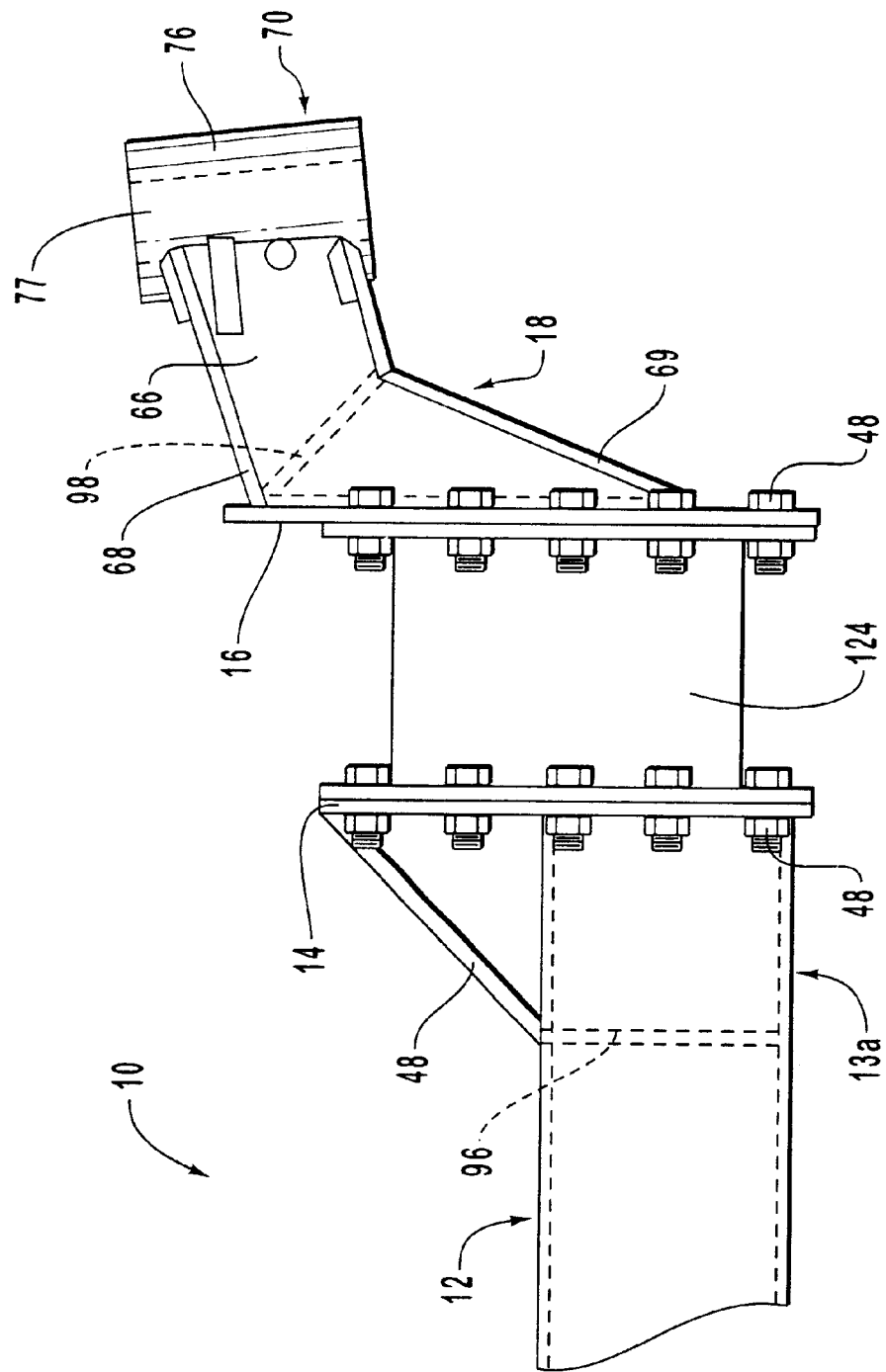
FIG. 8 is a front elevation view of an alternative embodiment of a standoff in accordance with the invention.

Referring to FIG. 8, a shim 124 may augment the interface between the axle 12 and the standoff 18. The shim 124 may be thought of as an additional standoff 18 adapted to extend the effective "width" of the apparatus 10 in a lateral 11c direction. Wheel assemblies may be shimmed wider apart according to the desired configuration of an apparatus 10 to be installed on a vehicle. Moreover, in certain embodiments bolts 48 may be arranged in a manner (e.g. distributed diagonally or horizontally) to provide direct lateral 11c positioning of the standoff 18 with respect to the axle 12, or shimmed standoff, as required.

Figure 9:
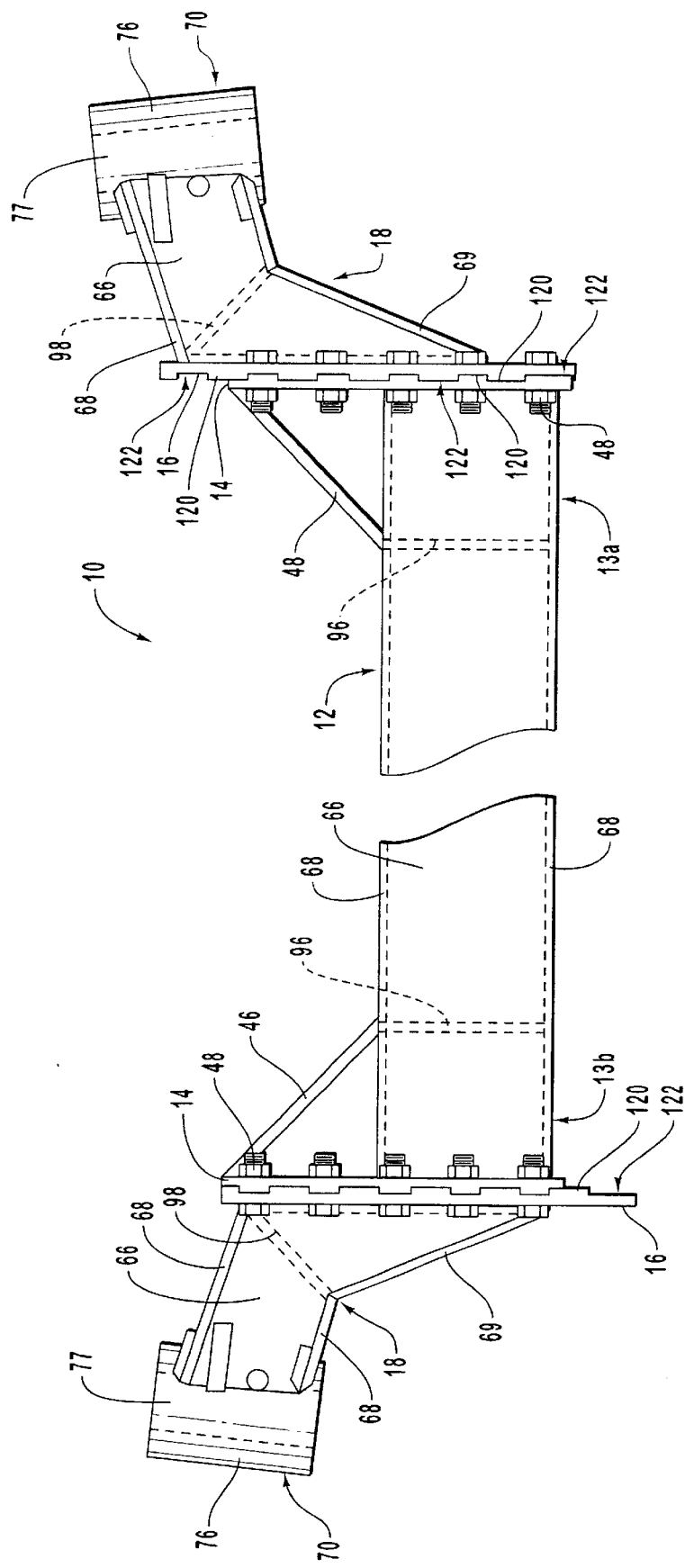
FIG. 9 is a front elevation view of a horizontally shimmed apparatus in accordance with the invention.

Referring to FIG. 9, an apparatus 10 may include a standoff 18 having lands 120 and grooves 122 adapted to interleave for supporting the standoff. Lands 120 and grooves 122 on the mount 16 mate with grooves 122 and lands 120, respectively on the standoff 18. Thus, the bolts 49 may hold the standoff 18 to the axle 12, while the lands 120 and grooves 122 (e.g. toothed structures) support the actually operating loads of the apparatus 10.

Thus, in an apparatus and method in accordance with the invention, one may fabricate a lightweight, height-adjustable axle. Different embodiments of standoffs may be used. Different embodiments of axles 12 may be used. Different types of beams 44 may be configured. Different types of mounting mechanisms and the like for securing wheel assemblies to rotate with respect to the axle 12, may be used in order to support steering, driving, trailing, and auxiliary leading or following.

From the above discussion, it will be appreciated that the present invention provides a lightweight, height-adjustable axle for use as a steering axle, drive axle, auxiliary leading axle, auxiliary following axle, or auxiliary trailing axle for a truck. The apparatus may be mounted by any suitable, conventional suspension system in the art of principal axle mounting or auxiliary axle mounting for trucks and the like.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for assembling an axle assembly to fit a vehicle, the method comprising:

selecting a vehicle of arbitrary configuration;

providing a first mount formed to secure to an axle;

providing the axle having a right end and a left end, the right end having a plurality of positions to receive the first mount, the difference between one of the plurality of positions and another of the plurality of positions being a translation of the first mount with respect to the right end;

positioning the first mount with respect to the right end of the axle based on characteristics of the selected vehicle; and securing the first mount to the right end.

2. The method of claim 1, further comprising securing the axle to the vehicle.

3. The method of claim 2, further comprising providing a first wheel assembly.

4. The method of claim 3, further comprising securing the first wheel assembly to the first mount.

5. The method of claim 4, wherein selecting the vehicle comprises selecting a truck.

6. A method for assembling an axle assembly to fit a truck, the method comprising:

selecting a truck of arbitrary configuration;

providing a first mount formed to secure a wheel assembly to an axle;

providing the axle having a right end and a left end, the right end having a plurality of positions to receive the first mount;

positioning the first mount with respect to the right end of the axle based on characteristics of the selected vehicle;

securing the first mount to the right end; and securing the axle to the truck as an auxiliary axle.

7. The method of claim 6, wherein the characteristics include the aesthetics of the vehicle.

8. The method of claim 7, wherein the characteristics include a load-bearing requirement of the vehicle.

9. The method of claim 8, wherein the characteristics include stability of the vehicle.

10. The method of claim 9, further comprising providing a second mount.

11. The method of claim 10, wherein providing the axle further comprises providing an axle with a left end formed to receive the second mount.

12. The method of claim 11, further comprising securing the second mount to the left end of the axle in a position to mirror the first mount and right end of the axle.

13. The method of claim 12, further comprising providing a second wheel assembly.

14. The method of claim 13, further comprising securing the second wheel assembly to the second mount.

15. The method of claim 1, wherein the characteristics include the aesthetics of the vehicle.

16. The method of claim 1, wherein the characteristics include a load-bearing requirement of the vehicle.

17. The method of claim 1, wherein the characteristics include stability of the vehicle.

18. A method for assembling an axle assembly to fit a vehicle, the method comprising:

selecting a vehicle of arbitrary configuration;

providing a first wheel assembly providing a first mount formed to secure the first wheel assembly to an axle;

providing the axle having a right end and a left end, the right end being formed to adjoin the first mount in a first position and in a second position, the difference between the first and second positions being a translation of the first mount with respect to the right end;

making a determination which of the first and second positions best fits the axle assembly to the vehicle;

securing together the first mount and the right end of the axle in accordance with the determination; and securing the first wheel assembly to the first mount.

19. The method of claim 18, wherein providing an axle further comprises providing an axle having a portion of the right end formed as a substantially vertically extending plate.

20. The method of claim 18, further comprising:

providing a second wheel assembly;

providing a second mount;

securing together the second mount and the left end of the axle in accordance with the determination; and securing the second wheel assembly to the second mount.

21. A method for assembling an axle assembly to fit a vehicle, the method comprising:

selecting a vehicle of arbitrary configuration;

providing a first wheel assembly providing a first mount formed to secure the first wheel assembly to an axle;

providing the axle having a right end and a left end, the right end comprising a removable right spacer, the right end being arranged so that when the right spacer is installed, the axle assembly is longer that when the right spacer is not installed, the right end receiving the first mount in a plurality of positions when the right spacer is installed as well as when the right spacer is not installed, making a determination which of the plurality of positions best fits the axle assembly to the vehicle;

securing together the first mount and the right end of the axle in accordance with the determination; and securing the first wheel assembly to the first mount.

22. The method of claim 21, further comprising making a first determination if the right spacer is needed to fit the axle assembly to the vehicle.

23. The method of claim 22, wherein positioning the first mount with respect to the right end of the axle based on characteristics of the selected vehicle further comprises making a second determination which position of the plurality of positions best fits the axle assembly to the vehicle.

24. The method of claim 23, wherein securing the first mount to the right end further comprises assembling together the right end and the first mount in accordance with the first and second determinations.

25. The method of claim 24, wherein providing an axle further comprises providing an axle wherein the left end comprises a removable left spacer to extend the axle assembly longer than when the left spacer is not installed.

26. The method of claim 25, further comprising providing a second mount and wherein providing an axle further comprises providing an axle wherein the left end thereof is formed to receive the second mount at multiple positions.

27. The method of claim 26, wherein making the first determination further comprises determining if the left spacer is needed to fit the axle assembly to the vehicle.

28. The method of claim 27, wherein making a second determination further comprises determining which position of the multiple positions best fits the axle assembly to the vehicle.

29. The method of claim 28, further comprising providing a second wheel assembly.

30. The method of claim 29, further comprising securing the second wheel assembly to the second mount.

31. The method of claim 30, wherein making the first and second determinations includes consideration of the aesthetics, load-bearing requirements, and stability of the vehicle.

\* \* \* \* \*